(No Model.) 5 Sheets—Sheet 1.
D. McMILLAN.
MACHINE FOR SHOCKING GRAIN.
No. 301,739. Patented July 8, 1884.
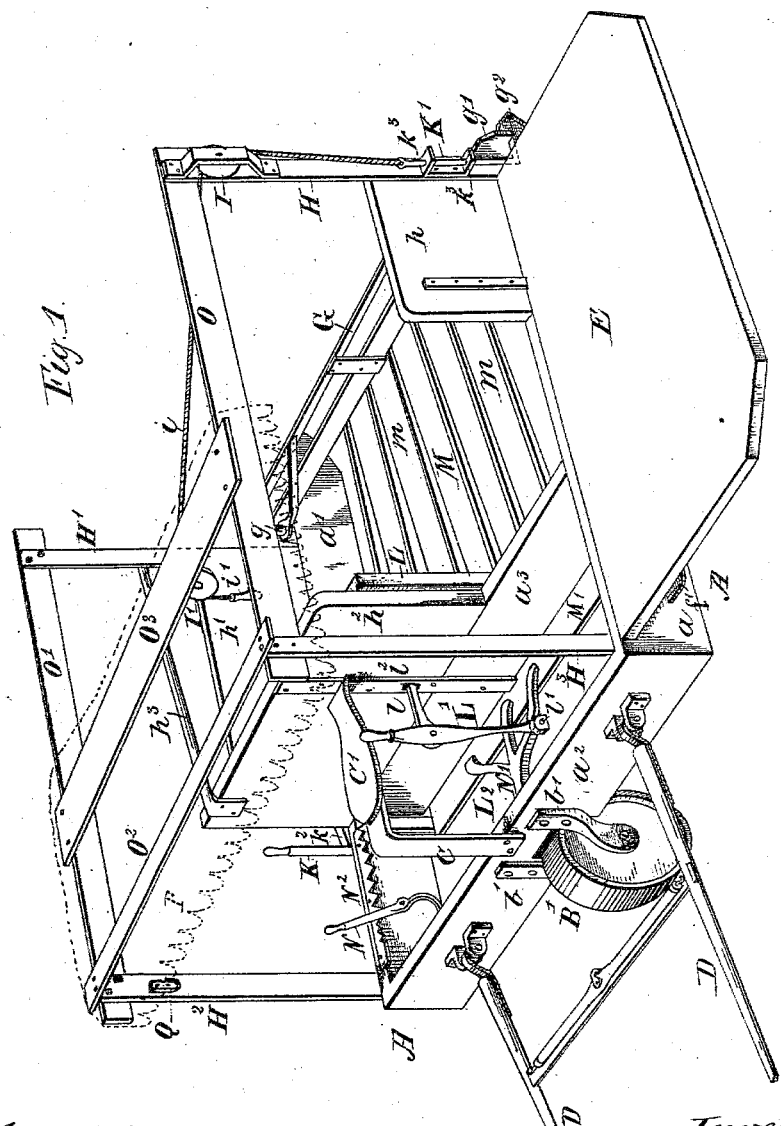
Witnesses
N. E. Boulter
Andrew Elmer
Inventor
Duncan McMillan
Henry Otto
his atty

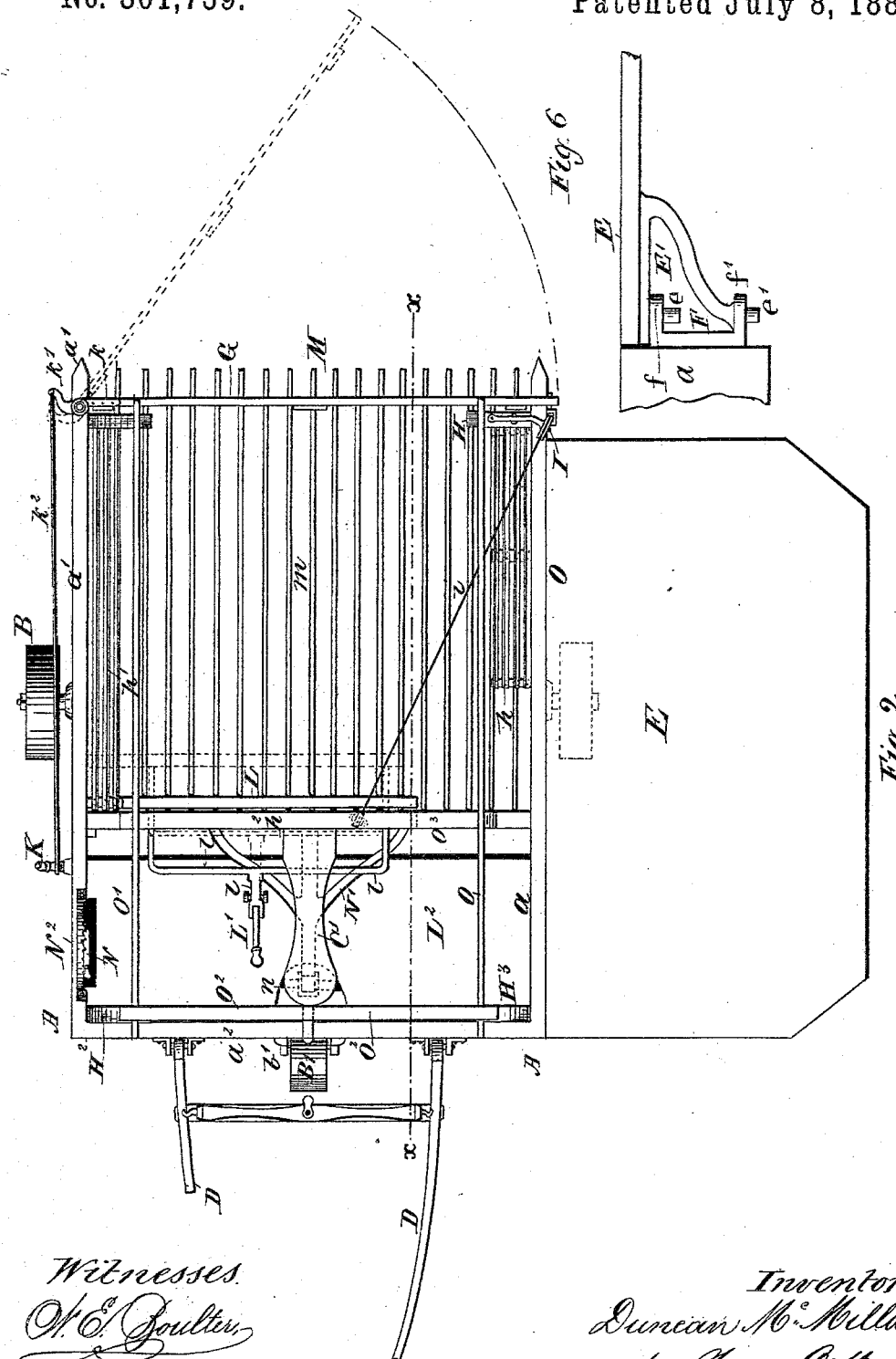

(No Model.) 5 Sheets—Sheet 3.
D. McMILLAN.
MACHINE FOR SHOCKING GRAIN.
No. 301,739. Patented July 8, 1884.
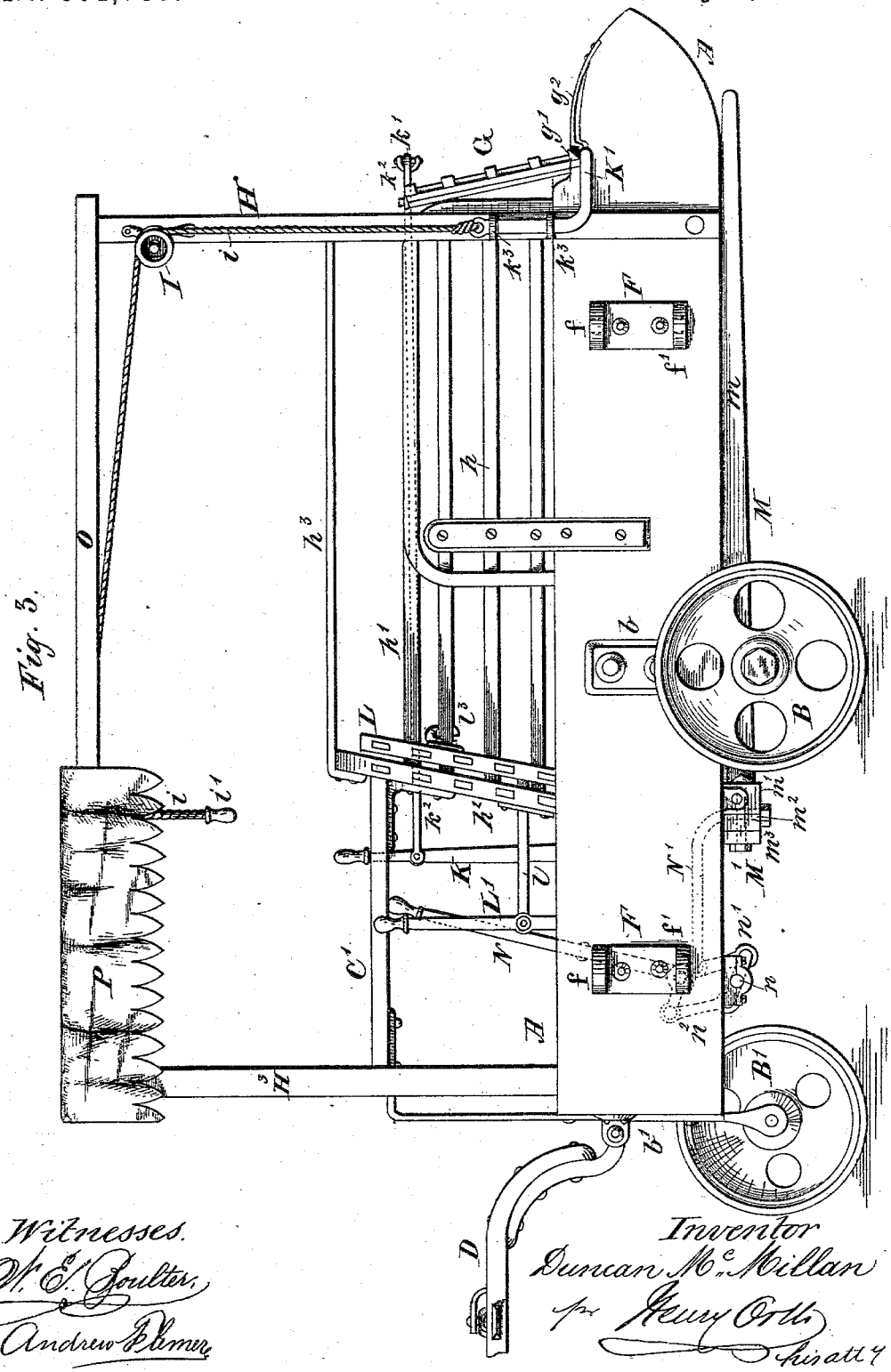
Witnesses.
N. E. Coulter,
Andrew Palmer
Inventor
Duncan McMillan
pr Henry Orth
his atty (No Model.) 5 Sheets—Sheet 4.
D. McMILLAN.
MACHINE FOR SHOCKING GRAIN.
No. 301,739. Patented July 8, 1884.
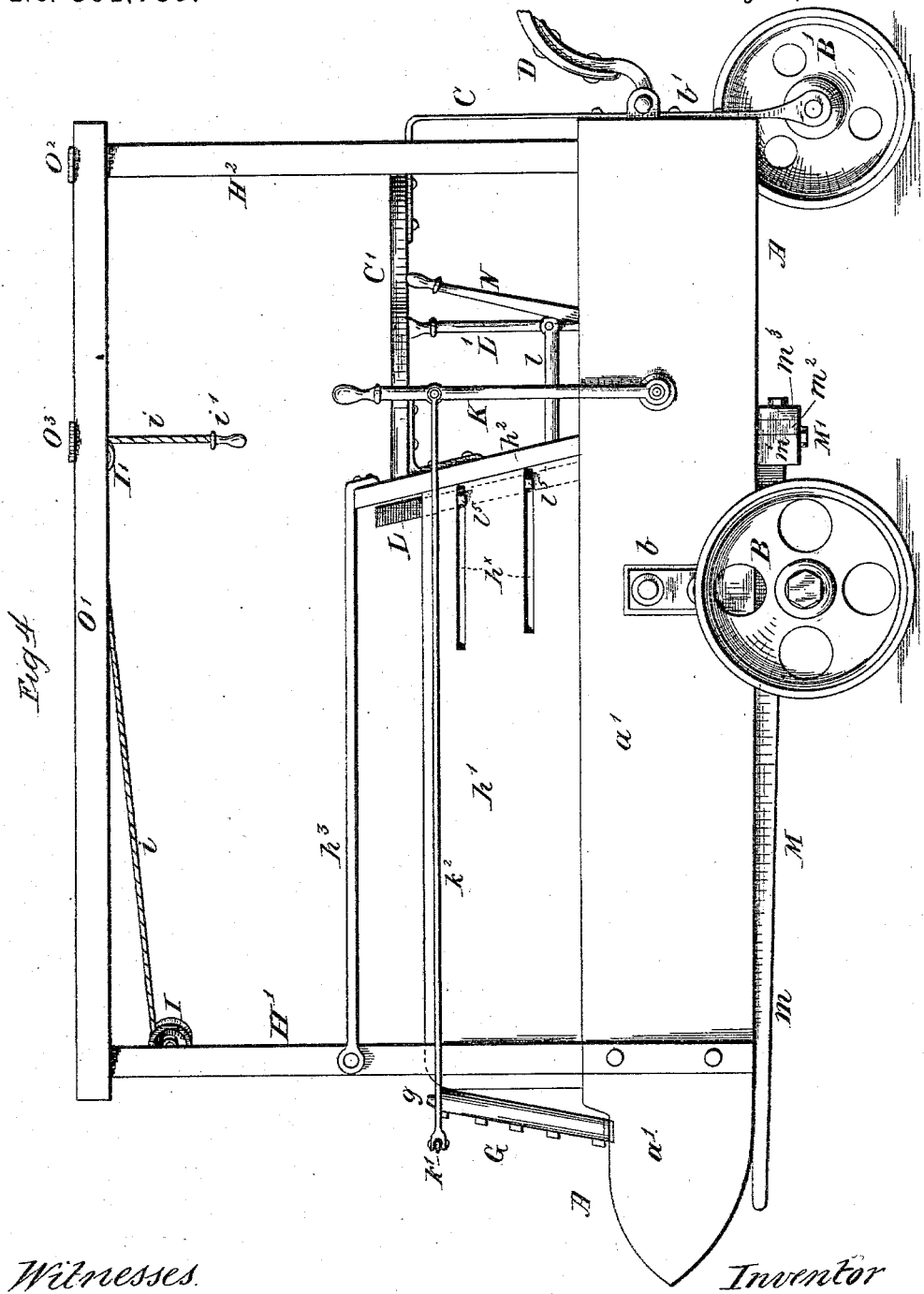
Witnesses
W. E. Boulter
Andrew Fleming
Inventor
Duncan McMillan
per Henry Orth
his atty.

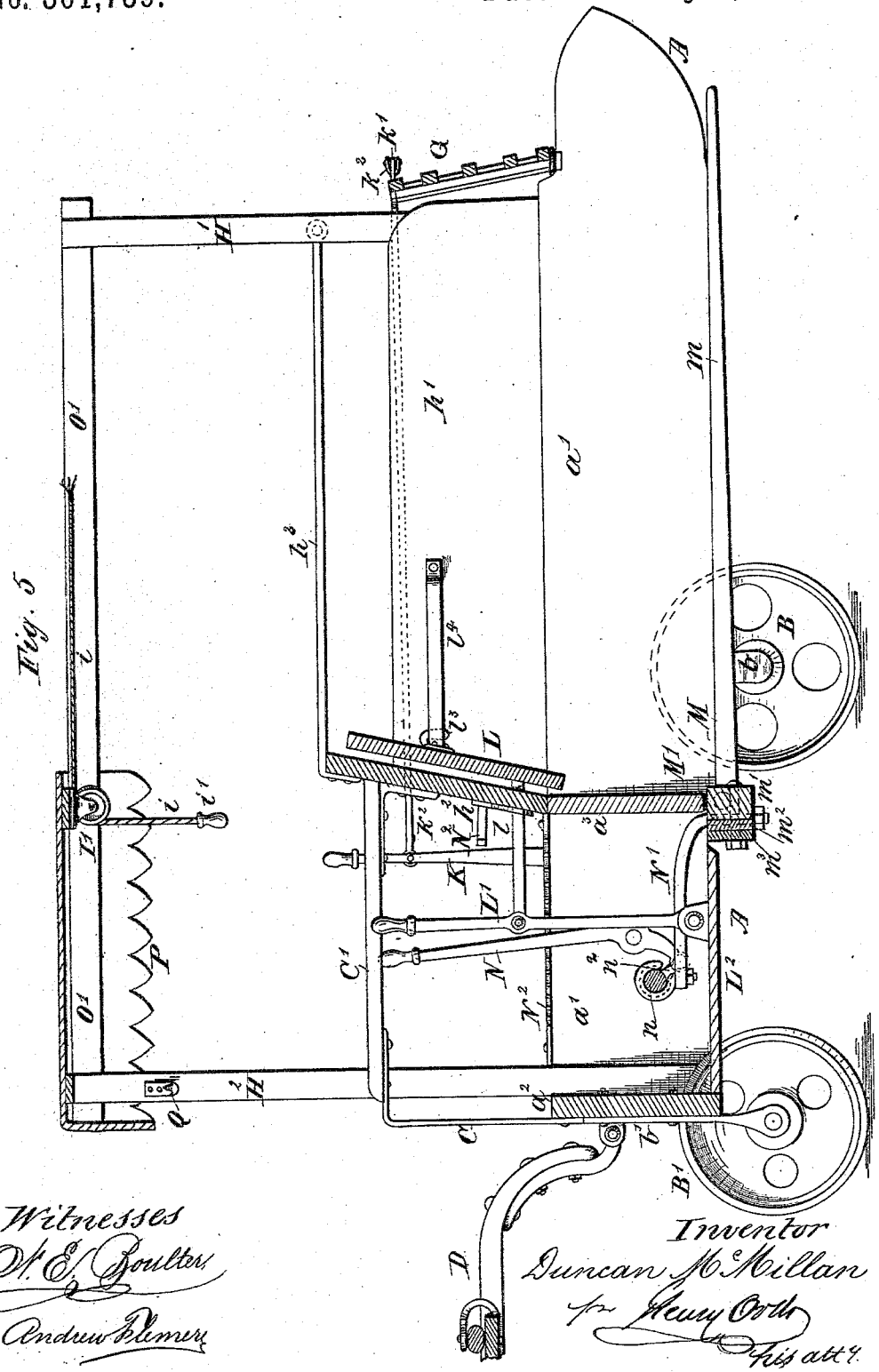

UNITED STATES PATENT OFFICE.

DUNCAN McMILLAN, OF MACOMB, ILLINOIS.

MACHINE FOR SHOCKING GRAIN.

SPECIFICATION forming part of Letters Patent No. 301,739, dated July 8, 1884.

Application filed September 10, 1883. (No model.)

*To all whom it may concern:*

Be it known that I, DUNCAN MCMILLAN, a citizen of the United States, residing at Macomb, county of McDonough, and State of Illinois, have invented a new and useful Improvement in Machines for Shocking Grain, of which the following is a specification.

My invention relates to that class of machines in which the bound sheaves or bundles of grain or straw are taken from the binder to a movable platform and there formed into shocks, and when so formed dropped to the ground in an upright position.

The invention consists in the arrangement, combination, and co-operation of parts, substantially as hereinafter fully described, and as shown in the accompanying drawings, in which—

Figure 1 is an isometrical projection of my improved shocking-machine. Fig. 2 is a top plan view thereof. Figs. 3 and 4 are opposite side elevations. Fig. 5 is a longitudinal section on line $x\ x$ of Fig. 2, and Fig. 6 is a detail view showing the mode of connecting the receiving-platform with the machine.

Like letters are used to indicate like parts throughout the specification.

My improved shocker is designed to be moved by one or more horses, according to the nature of the ground alongside of the delivery-platform of a binder or a combined binder and harvester, the horse being tied or coupled to the off horse of the harvester, so that the shocker will not require a separate driver.

Grain or straw shockers as heretofore constructed are run alongside of the delivery-platform of the binder or harvester and binder, and the bundles or sheaves taken from said platform onto a movable platform or dropper of the shocker. Under some circumstances this is a disadvantage, inasmuch as the two machines are too close together and apt to crowd each other, to avoid which I prefer to use a shocker-platform projecting from that side of the machine adjacent to the delivery-platform of the binder or combined harvester and binder, to afford ample space for the reception of the bundles or sheaves. I also arrange the superstructure of the shocker, with a view to cover the same or a part thereof, with an awning to shield the operator from the rays and heat of the sun.

My improved shocker is composed of a rectangular frame, A, consisting of two longitudinal girts, $a\ a'$, and a front transverse girt, $a^2$, the former being provided with suitable bearings, $b\ b$, for the short axles of two carrying-wheels, B B, these bearings being at such point as to nearly counterbalance the frame and parts connected therewith when a full shock is on the dropper-platform, for purposes that will be readily understood. The front transverse girt, $a^2$, is also provided at its center with bearings $b'$, for a guide and supporting wheel, B', as shown, and with a standard or seat-spring, C, projecting inwardly and carrying the seat C' for the operator, and said girt is provided with any suitable means for connecting therewith a tongue or pole or shaft, D, for the draft animal or animals.

To the side $a$ of the frame, which runs alongside of the binder-delivery platform, is detachably secured a receiving-platform, E, to which the sheaves are delivered from the binder-platform, the longitudinal girt $a$ of the frame having suitable brackets F, bolted or otherwise secured thereto, from the perforated projecting lugs $f\ f'$ of which the platform E is supported, said platform having braces or supporting-brackets E', terminating each in two hooks, $e\ e'$, the former hooking into lug $f$, and the latter into lug $f'$, as shown in Fig. 6.

The superstructure of the frame consists of four standards, H H' H² H³, two longitudinal girts or braces, O O', and two transverse girts or braces, O² O³. The standard H³ may, if desired, be secured to the front transverse girt, $a'$, in proximity to the attendant's seat, to leave that part of the machine unobstructed. The longitudinal girts O O' and the transverse girt O² may be provided with hooks or other suitable devices to secure an awning, P, over the front part of the machine, where the attendant stands or sits, to shield him from the rays and heat of the sun; or said awning may be secured to the front part of the machine in any other desired manner.

Q is a hook on standard H², to which the reins of the draft-animal are hooked. The rear end of the frame is normally closed by a gate, G, preferably made of slats or bars, and arranged to incline inwardly from bottom to top. It is hinged at one end to a suitable pivot or pintle, $g$, projecting vertically from the upper face of the off-side longitudinal girt $a'$. At its opposite end said gate is provided with a latch-bolt, $g'$, that is normally held in a keeper or catch, $g^2$, secured to the rear end of the girt $a$, the arrangement being such that the gate will automatically swing to and lock itself closed when opened, as hereinafter described. The latch-bolt $g'$ may be formed by the lower slat projecting beyond the other slats of the gate, and arranged to ride up the inclined face of the keeper $g^2$ and fall into the catch thereof when the gate is closed.

The gate G is opened by the attendant by devices arranged and operating as follows: Upon the standard H, secured to the girt $a$ in proximity to the latch-bolt, which projects slightly beyond said girt, is mounted a grooved pulley, I, over which passes a chain or rope, $i$, attached at one end to a latch-lifter, K', arranged to slide in suitable bearings, $k^3$, on standard H. The chain or rope $i$ passes from pulley I over a second pulley, I', mounted in bearings secured to girt $O^3$ at a point in proximity to the attendant's seat, and said rope has at that end a suitable pull, $i'$. The upper hinge-strap, $k$, of the gate has an extension, $k'$, to which is pivoted one end of a connecting-rod, $k^2$, the other end of which is pivoted to an operating-lever, K, which in turn is pivoted upon a stud secured to the outer face of the longitudinal girt $a'$, so as to bring the lever within reach of the attendant.

It is obvious that on pulling upon the rope $i$ with one hand, to lift the latch-bolt or the gate and with it the latch-bolt out of the catch of the keeper, and then pulling upon the lever K, the gate G will open outward. If desired, the latch-lifter K' may be dispensed with, and the gate supported upon its hinges in such manner that when pulling upon the lever K the gate will be lifted and swung open, a construction that is too well known to need any detailed description.

Upon the main frame A is arranged a shocking-box, the bottom of which is formed by the dropper-platform, hereinafter described, the rear side or wall by the gate G, the front side by a transverse girt, $a^3$, and a partition, $h^2$, of light boards, and the side walls by the longitudinal girts $a\ a'$, and by upwardly-extending walls $h$ and $h'$, also made of light boards, as shown in Figs. 1, 4, and 5. The walls of the box formed as described incline toward one another—that is to say, they all converge inwardly to contract the upper open end of the box so that it will correspond more or less to the form of the shock, as shown. The front wall, $h^2$, may be connected with the side wall, $h'$, and in practice I make this wall higher than the remaining walls, and in order to more securely brace the same I employ a brace-rod, $h^3$, bolted to said wall, and the standard H', as shown in Figs. 1, 3, and 5.

To reduce the weight of the machine, the walls $h'\ h^2\ h^3$ may be made of slats or bars, as shown in Fig. 3, to make them lighter.

As shown, the walls $h$ and $h^2$ on the receiving side of the machine do not come in contact, so as to leave a space for the passage or introduction of the sheaves into the shocking-box, to avoid the labor of lifting the said sheaves over the walls of the box when forming the shock.

The standards H, H', and H$^2$ are preferably made to incline inwardly, so as to provide a more convenient means for securing the walls of the shocking-box thereto, and also to contract the superstructure of the machine.

L is a compressing-follower in front of the wall $h^2$ of the shocking-box, secured to one end of an actuating-rod, $l$, that passes through a slot, $l^2$, in said wall, as in Fig. 1, or through a guide-plate when the guard is made of slats or bars, as shown in Fig. 3. The opposite end of the connecting-rod is pivoted to an actuating-lever, L', that has its fulcrum $l'$ upon the platform L$^2$, upon which the attendant may stand, if preferred.

To the front or rear face, or to the edge of the follower L, is secured a hook, $l^3$, that rides on a rail, $l^4$, secured to the inner face of the wall $h'$ of the box, to properly guide the follower in its movement to compress the shock. Any other suitable device may be employed to guide the follower—as, for instance, the guard $h'$ may be slotted, as shown in Fig. 4, and the compressor may be provided with a lug or lugs, $l^5$, projecting therefrom and into the slot or slots $h^\times$ in said guard $h'$, and if the latter is made of bars or slats these may be arranged to form the guides for the lugs, which in this case will slide between two such bars, as shown in Fig. 3.

It is obvious that when the lever L' is moved rearward the follower L will move in the same direction toward the gate G and compress the shock. This application of pressure not only insures a greater compactness of the shock, but also assists in swinging open the gate G when said shock is to be discharged.

M indicates a dropper-platform composed of a series of bars, $m$, secured to a suitable head, M'. The latter I preferably make in three parts, $m'\ m^2\ m^3$, as shown in Figs. 3 and 5. The bar or girt $m'$, to which the bars $m$ are secured, forms the head of the cradle or grid platform M, and in said girt one half of the bearing for the reception of the actuating or supporting rod or rods N' is formed, and said head $m'$ is pivoted to girts $a\ a'$. The part $m^2$ has the other half of the said bearings formed therein, and the bar or girt $m^3$ serves as a locking-bar, by means of which said girts $m'\ m^2$ are rigidly secured together. Although I prefer this arrangement of dropper-head, I do not desire to limit myself thereto, as any other suitable construction of head M' may be employed. The rod or rods N' are secured to a transverse shaft or bar, n, hinged at one end to girt a, and at the opposite end said bar is pivoted to a link, n', to which a second link, n², is pivoted. The latter link is pivoted to the lower end of an operating-lever, N, that has its fulcrum upon the girt a', to which is secured a toothed bar or sector, N², or other equivalent device, to hold the lever when the dropper M is in its normal position.

It is obvious that when the lever N is released from the sector by the attendant, the dropper M, the head m' of which is pivoted to girts a a', as stated, will, by its own weight and the weight of the shock, drop to the ground, the attendant at the same time pulling upon the rope i and lever K to open the gate, when the shock will slide off the dropper onto the ground in an upright position.

The head of the dropper, instead of being pivoted in the longitudinal girts, may be mounted on a transverse shaft or axle adapted to support the carrying-wheels.

If desired, the follower L may be operated from a treadle or treadles, or in any other desired manner, and means may be provided to lock the lever L' in position when the follower has been moved to compress the shock, as shown in Fig. 5, so that the latter will remain under pressure until the gate is swung open, assist in discharging the shock, and enable the attendant to use both hands to release and open the gate G, for which purpose a locking-stud, N², may be secured to the guard h³.

The actuating-rod l may be forked, and the branches thereof connected near the opposite sides of the follower, and the guide-rail or guide-lugs may thus be dispensed with.

It will be seen that by means of the construction described I provide a compressing-box within which the shock may first be formed and then compressed, and that the interior space of said box conforms to or nearly to the form of the shock, it being made to taper from the dropper or bottom thereof upward.

From what has been said above and from the accompanying drawings any one acquainted with this class of machines will readily understand the operation of my improved shocker.

I am aware that it has been proposed to use devices for compressing the shock on a dropper-platform. The pressure, however, has mainly been applied to the small end of the shock; but by means of the follower herein described and the form of compressing-box wherein the shock is formed the pressure is applied to or practically to the entire surface thereof.

Having now described my invention, what I claim, and desire to secure by Letters Patent, is—

1. In a machine for shocking grain, the combination, with a dropper-platform and a compressing-box surrounding the same, of a compressing-follower arranged to move horizontally within said box, as described, for the purpose specified.

2. In a machine for shocking grain, the combination, substantially as herein described, of a dropper-platform, a compressing-box surrounding the same, and having upwardly-converging walls, and a compressing-follower arranged to move horizontally within said box, for the purpose specified.

3. In a machine for shocking grain, the combination, substantially as herein described, of a dropper-platform, a compressing-box surrounding the same, and having the rear wall adapted to swing outwardly, a compressing-follower arranged to move horizontally within said box, and means, substantially such as described, to simultaneously drop the platform and swing the rear wall of the box outwardly to discharge the shock.

4. In a machine for shocking grain, the combination, substantially as herein described, of a dropper-platform, a compressing-box wherein the shock is formed, a compressing-follower arranged to move horizontally within the box to compress the shock, and means, substantially such as described, to throw open the rear wall of the box and drop the platform while the shock is under compression, as described, for the purpose specified.

5. In a machine for shocking grain, the combination, substantially as described, of a dropper-platform, a compressing-box having inwardly and upwardly converging walls, the rear wall adapted to be swung outwardly, said box provided with a compressing-follower arranged to move horizontally within the box, and means, substantially such as described, to drop the platform and swing the rear wall of the box open, for the purpose specified.

DUNCAN McMILLAN.

Witnesses:
A. W. FALKENTHAL,
WM. S. WOLF.